United States Patent [19]

Foye et al.

[11] Patent Number: 4,859,247

[45] Date of Patent: Aug. 22, 1989

[54] LOW VISCOSITY, HIGHLY CONCENTRATED PIGMENT DISPERSIONS AND METHOD OF MAKING SAME

[75] Inventors: Thomas E. Foye; Joseph P. Baillargeon, both of Holland, Mich.

[73] Assignee: BASF Corporation, Parsippany, N.J.

[21] Appl. No.: 115,963

[22] Filed: Nov. 2, 1987

[51] Int. Cl.$^4$ .............................................. C08J 3/02
[52] U.S. Cl. .................................. 106/505; 106/499; 106/504
[58] Field of Search ................... 106/308 N, 309, 504, 106/505, 499

[56] References Cited

U.S. PATENT DOCUMENTS 2,327,596  8/1943  Erickson et al. ...................... 106/30
4,301,049  11/1981  Funatsu .......................... 106/308 N

FOREIGN PATENT DOCUMENTS 8402142  6/1984  World Int. Prop. O. .

OTHER PUBLICATIONS

Derwent Abstracts, Abstract No. 84-158683/25, "Concentrate for Aqueous Lithographic Fountain Sols.", World Patent WO8402142, 6/7/84.

*Primary Examiner*—Paul Lieberman
*Assistant Examiner*—Christine A. Skane
*Attorney, Agent, or Firm*—Rupert B. Hurley, Jr.

[57] ABSTRACT

An oil-soluble viscosity-reducing additive made by combining an amine and a polybasic organic acid permits the incorporation of large proportions of pigment into pigment dispersions. The increased proportion of pigment provides advantages in the manfucture of inks.

20 Claims, No Drawings

LOW VISCOSITY, HIGHLY CONCENTRATED PIGMENT DISPERSIONS AND METHOD OF MAKING SAME

BACKGROUND OF THE INVENTION

The present invention relates to pigment dispersions containing a viscosity-reducing additive. By lowering the viscosity of the dispersions, still more pigment may be added to the dispersions, resulting in a very highly concentrated dispersion which can be satisfactorily handled and dispersed.

Pigments sold to ink manufaturers are usually in two forms: (1) dry powders and (2) concentrated dispersions. Pigments sold in the second form are offered at as high a concentration as the ink manufacturer can use, in order to provide the following advantages to the ink manufacturer:

(A) a more concentrated pigment dispersion allows the inkmaker greater formulating latitude (e.g. to increase performance or lower costs) because less dispersion must be added to maintain any particular pigment level in the ink; and (B) the greater formulating latitude permits the inkmaker to produce a wider variety of inks (e.g. the same dispersion could go into heatset, quick-set, and news ink);

(C) the more concentrated pigment dispersion permits a lower inventory volume and less raw material testing by the inkmaker.

The upper limits of pigmnt concentration are determined by physical handleability. As the pigment concentration in the dispersion increases linearly, the viscosity of the dispersion increases exponentially. If the dispersion is too high in viscosity, the inkmaker can no longer satisfactorily disperse the concentrated pigment in the ink manufacturing process. Furthermore, as the pigment concentration increases, the ink manufacturer experiences increasing frictional heat buildup during the dispersion process. This heat buildup will degrade certain pigments. In addition, as the inkmaker's dispersion difficulties increase, so does the amount of labor-intensive handling required to achieve successful dispersion.

Most pigment dispersion manufacturers operate near an upper limit of pigment concentration, in order to provide inkmakers with the several adantages described above, without creating the problems resulting from too high a pigment concentration. The product and method of the present invention enable the manufacturer of a pigment dispersion to significantly decreae the viscosity of a pigment disperion by adding a relatively small amount of a viscosity-reducing agent. The lower viscosity allows the pigment dispersion manufacturer, in turn, to increase the pigment concentration back to the point at which the resulting maximum viscosity is reached. Thus the pigment dispersion manufacturer may now produce a dispersion which has a viscosity at the maximum amount and pigment concentration significantly above the concentration attainable without use of the additive.

The closest art of which applicants are aware is PCT application WO 84/02142, published 7 June 1984, to Inmont Corporation. This application discloses the use of a water-soluble buffer for use in lithographic fountain solutions in which the buffer is a salt of a polycarboxylic acid and an organic amine. The present invention differs from the Inmont application in that the Inmont application nowhere suggests the addition of an oil-soluble buffer to a flush. In order to produce the desired result of the present invention, the additive must be added to an oil-based flush, rather than to the water-based fountain solution referred to in the Inmont application. Thus both the purposes and means of the present invention are different from the Inmont application.

BRIEF DESCRIPTION OF THE INVENTION

The present invention pertains to a pigment dispersion and process for making same. The pigment dispersion comprises at least 1.0 percent (based on the weight of pigment in the dispersion) of an oil-soluble additive which is a reaction product of an oil-soluble, long chain aliphatic amine having a molecular weight between 80 and 340 and a polybasic organic acid having a molecular weight between 50 and 250. In general, the pigment dispersion comprises between 20 and 65 percent (based on weight of dispersion) of pigment.

Preferably the amine is an alkylamine having an average chain length of C-18. In addition, the dispersion comprises at least 20 percent (by weight of dispersion) pigment and at least 35 percent (by weight of dispersion) carrier. Preferably the additive is a salt. Preferably the polybasic acid is adipic acid. Preferably the pigment dispersion comprises between 1 percent and 10 percent (by weight of pigment) of additive, and between 30 percent and 55 percent (based on weight of dispersion) of pigment. It is preferred that the pigment is an organic pigment, especially a Lithol Rubine pigment or a Diarylide Yellow pigment. It is preferred that the dispersion also have a viscosity at 40° C. of between 1000 and 6000 poise at 0.5 sec$^{-1}$ and a yield value at 0.05 sec$^{-1}$ of between 200 and 1000 dynes/cm$^2$.

The present invention is also concerned with a method of making a pigment dispersion. The method preferably comprises adding between 1.0 percent and 8 percent, by weight of pigment, of an oil-soluble additive which is a reaction product of:

(1) an oil-soluble, long-chain aliphatic amine having a molecular weight between 80 and 340, with (2) a polybasic organic acid having a molecular weight between 50 and 250.

As with the preferred composition of the invention (i.e. the preferred pigment dispersion), in the preferred process the additive is a salt, and adipic acid is the most preferred acid. In addition, it is preferred to incorporate between 30 percent and 55 percent (based on weight of dispersion) of pigment in the dispersion.

DETAILED DESCRIPTION OF THE PREFERRED EMBODIMENTS

The viscosity-reducing additive used in present invention is a reaction product. The most preferred additive is a salt. In general, the salt can be made by:

(1) dissolving x moles of the amine in an aliphatic solvent, in order to form an amine solution; and (2) heating the amine solution to approximately 90° C., accompanied by mild agitation; and (3) discontinuing heating and simultaneously adding x moles of the acid, followed by mixing the acid with the amine solution for about 15 minutes while the amine solution is cooling, followed by allowing the resulting mixture to cool to room temperature.

From this procedure it can be seen that it is preferred to add equimolar quantities of amine and acid in order to make the salt. In addition, the preferred molar ratio of aliphatic solvent to amine is 6:1. Several preferred solvents include, among others: methanol, isopropanol, toluene, aliphatic hydrocarbons including petroleum distillates having a boiling range of 200° C. to 375° C. (e.g. Magiesol 47). Other solvents believed operable include: ethanol, n-propanol, butanol, xylene, mineral spirits, VMP naptha, Solvesso No. 100, acyclic ketones and ethers such as methyl isobutyl ketone, Methyl Cellosolve, and ethylene glycol monomethyl ether.

The amine used to make the additive is an oil-soluble, long-chain aliphtic amine having a molecular weight between 80 and 340. The amine must be oil-soluble in order to form an oil-soluble salt with a non-oil-soluble organic acid. By "long-chain" it is meant that the longest carbon chain ranges from C6 to C20. Several preferred amines include, among others: octylamine, n-dodecylamine, tetradecylamine, n-octadecylamine, cocoamine, tallowamine, hydrogenated tallow amine and oleylamine.

The acid used to make the additive is a ploybasic organic acid having a molecular weight between 150 and 250. By "polybasic" it is meant that the acid molecule has at least two carboxylic acid groups thereon. Several preferred polybasic acids include, among others: succinic acid, glutaric acid, adipic acid, pimelic acid, suberic acid, azelaic acid, and citric acid.

The additive may be incorporated into the pigment disperson in an amount up to about 10 percent by weight (based on weight of pigment). However, to be effective it is believed that at a minimum, at least one percent additive should be used. It is preferable to incorporate between 1 percent and 8 percent (based on weight of pigment) additive into the dispersion.

The additive may be incorporated into the dispersion either during the production of the dispersion or after the dispersion has been produced. Preferably the additive is incorporated into the flush during either the break stage (when phase transfer is occurring) or afterwards in the dilution or thinning stage. The additive is incorporated into the dispersion by simply mixing the additive thereinto.

The additive is utilized in order to reduce the viscosity of the dispersion. The many types of pigment dispersions within which the additive may be incorporated are described below.

This invention may be employed in conjunction with the production of many different pigments. Since the scientific nomenclature for dyes and pigments is very difficult, trade names are used almost exclusively in speaking of them. Examples of pigments for which this invention is applicable identified by the Color Index or C.I. names are as follows.

Pigment Red 1, Pigment Red 3, Pigment Red 4, Pigment Red 48:1, Pigment Red 48:2, Pigment Red 48:3, Pigment Red 48:4, Pigment Red 49:1, Pigment Red 49:2, Pigment Red 53:1, Pigment Red 52, Pigment Red 57, Pigment Red 81, Pigment Red 190, Pigment Orange 13, Pigment Orange 19, Pigment Orange 46, Yellow 12, Pigment Yellow 13, Pigment Yellow 14, Pigment Yelow 17, Pigment yelow 27, Pigment Yellow 83, Pigment Green 7, Pigment Green 36, Pigment Blue 6, Pigment Blue 15:3, Pigment Blue 61.

The term "carriers", as used herein refers to any of the hydrophobic organic vehicles that are commonly used in printing ink and coating compositions which may be employed in the method and composition of this invention. Such vehicles are represented by drying, semi-drying, and non-drying oils, litho varnishes, mineral oils, rosins, dimerized rosins, esters of dimerized rosins, aliphatic and aromatic hydrocarbon resins, alkyl-aromatic resins, maleic and fumeric-modified rosin, phenolic resin, phenolic-modified rosin esters, alkyd resins, urethane-modified alkyds, polyolefins, polyindenes, coumarone/indene resins, phthalate esters, castor oil, fish oil, linseed ol, gloss varnishes, and various heat-set, quick-set and steam-set vehicle systems.

The vehicle may be a solution of a resin or mixture of resins and other additives in a solvent.

Typical resins which can be advantageously employed in such solutions are illustrated in the following table:

TABLE I

| No. | Resin Type | Trade Name of Resin |
|---|---|---|
| 1. | Isophthalic Alkyd based on Linseed Oil | AVO-791 |
| 2. | Polyamide Alkyd | Nylin 5 |
| 3. | Phenolic Modified Rosin Ester of Abietic Acid | Beckacite ® 24-102 |
| 4. | Maleic Modified Rosin Ester of Abietic Acid | Filtrez 3790 |
| 5. | Pentaerythritol Ester of Dimeric Resin Acids | Pentalyn K |
| 6. | Aliphatic Hydrocarbon | Piccovan ® AB165 |
| 7. | Aromatic Hydrocarbon | LX ®-685-135 200 |
| 8. | Modified Hydrocarbon | Nevroz ® 1420 |
| 9. | Aromatic-Aliphatic Hydrocarbon | Petrorez 200 |

As solvent in the resin-solvent type vehicle there may be employed aliphatic hydrocarbons, including petroleum distillates having a boiling range of 200° C. to 370° C., petroleum solvents such as mineral spirits and VMP nahtha, petroleum aromatic solvents, such as Solvesso No. 100, aromatic solvents having a boiling range 150° to 180° F. and a KB value of 91, aromatic solvents having a KB value of 92 to 100 such as xylene, and acyclic alcohol, ketones, and ethers, such as butanol, methyl isobutyl ketone, and Methyl Cellosolve ® (ethylene glycol monomethyl ether). The solvent mixtures will vary with the resins used and may be adjusted accordingly, but must be capable of dissolving the resin completely.

The dispersions may contain pigments in concentrations ranging from 20 percent to 60 percent (by weight of dispersion). Preferably, however, the pigment concentration within the dispersion is from 30 percent to 55 percent (by weight of dispersion). Mixtures of pigments may be used. As is described in Example 2, below, it is preferable to use the additive to reduce viscosity so that a still more concentrated pigment dispersion can be made, this "more concentrated" dispersion having a viscosity near the maximum viscosity which an ink-maker can utilize. To this end, it is preferable to make a dispersion having a viscosity at 40° C. of approximately 3000 poise at 0.5 sec$^{-1}$ and a yield value at 0.05 sec$^{-1}$ of approximately 300 dynes cm$^2$. Prferably the dispersions having this viscosity will also have a pigment concentration between 30 percent and 55 percent pigment (by weight of dispersion).

EXAMPLE 1

Additive Preparation

A 281.25 gram aliquot of Magiesol 47, an aliphatic hydrocarbon petroleum distillate, was combined (in a vessel) with 112.5 grams (0.40 moles) of Armeen ® 18D, an alkylamine having a C-18 average chain length.

The mixture was heated until it reached 90° C., under mild agitation. Then 56.25 grams (0.39 moles) of adipic acid were added to the vessel, and the mixture was mixed for 15 minutes with the heat turned off. After mixing, the mixture was allowed to cool slowly to room temperature. The product was found to contain 37.5% active salt, based on the weight of the mixture.

Incorporation of the Additive Into a Pigment Dispersion

An experimental flush (i.e. a color base in paste form) was prepared as follows. A presscake contained 500 parts (23.6 percent by weight of presscake) of a Lithol Rubine pigment. The presscake was divided into four fractions of equal weight. Two of these fractions were added to a sigma blade mixer known as a flusher. The flusher was started. Steam was applied to the jacket until the temperature reached 65° C. Then the following material was added:
(a) 52 parts of a linseed oil alkyd; and
(b) 176 parts of a solution of 72 percent Filtrez 3790/28 percent Magiesol 47; and
(c) 122 parts of a solution of 60 percent Petrorez 140/40 percent Magiesol 47;
after which a first break occurred and the flusher was stopped. The clear aqueous phase was poured off.

Then 125 additional parts of pigment in the form of one additional fraction of presscake were added to the flusher. The flusher was started and again heated to 65° C. 63 Parts of a solution of 60 percent Petrorez 140/40 percent Magiesol 47 were added, the next break occurred and the flusher was stopped. Again, the clear aqueous phase was decanted.

Then a final 125 parts of presscake were added to the flusher. The flusher was stared again and heated to 65° C. 79 Parts of 60 percent Petrorez 140/40 percent Magiesol 47 were added, the last break occurred and the flusher was stopped. The clear aqueous phase was then decanted.

After the last break was poured, 77 parts of 60 percent Pentalyn ® K/40 percent Magie 535 were added, along with 26 parts of 60 percent Petrorez 140/40 percent Magiesol 47. The flusher was started, sealed and vacuum applied the flusher was run until the batch temperature reached 110° C. At this point the cold water was turned on the jacket, and 93 parts of the additive (prepared above) along with 147 parts of a solution of 60 percent Petrorez 140/40 percent Magiesol 47 and 25 grams of water were added. The flusher was stopped while still under vacuum. The flusher was occasionally started and quickly stopped over a period of fifteen minutes to allow for rapid cooling. After this point, the temperature of the batch was 70° C. and the cold water on the jacket was turned off.

The flusher was started, maintaining vacuum and the remaining flush thinning vehicle composed of:
(a) 47 parts of a solution of 72 percent Filtrez 3790/28 percent Magiesol 47; and
(b) 125 parts of a solution of 60 percent Petrorez 140/40 percent Magiesol 47; and
(c) 6 parts of Magiesol 47
were added as fast as possible. The vacuum was then shut off and the finished product removed from the flusher. The resulting experimental flush contained 33 percent pigment based on the weight of the flush.

Then a corresponding control flush was prepared as described in Example 3.

The viscosity of the control flush was then qualitatively compared with the viscosity of the experimental flush. The qualitative comparison was carried out by manually "feeling" the flush. The test resulted in a "softness" rating. The softer the flush was, the lower the viscosity of the flush. Relative to the control flush, the experimental flush had a rating of very soft. Since both the experimental flush and the control flush contained approximately the same percent pigment, the presence of the additive had a significant effect on the viscosity of the flush.

EXAMPLE 2

Additive Preparation 2000 grams of 60 percent Petrorez 140/40 percent Magiesl 47 were added to a vessel along with 168 grams of Magiesol 47. This was heated to 90° C. Then 168 grams (0.60 moles) of Armeen ® 18D were added to the beaker, after which the resulting mixture was stirred for 10 minutes to dissolve the amine. 84 Grams (0.57 moles) of adipic acid were then added to the beaker, following which the mixture was stirred for 30 minutes. The mixture was then allowed to slowly cool to room temperature. The resulting mixture was found to contain 10.4 percent active salt (based on weight of the mixture) of Armeen ® 18D and adipic acid.

Incorporation of the Additive Into a Pigment Dispersion

An experimental flush was prepared as follows. A presscake contained 500 parts (23.8 percent by weight of presscake) of a Lithol Rubine pigment. The presscake was divided into 4 fractions of equal weight. Two of these fractions were added to a sigma blade mixer known as a flusher. The flusher was started. Steam was applied to the jacket until the temperature reached 65° C. Then the following material was added:
(a) 52 parts of a linseed oil alkyd; and
(b) 177 parts of the additive make above;
after which the first break occurred and the flusher was stopped. The clear aqueous phase was poured off.

125 additionsl parts of pigment in the form of one additonal fraction of the presscake and 73 additional parts of additive were added to the flusher. The flusher was started and again heated to 65° C. A second break then occurred and the flusher was stopped. Again the clear liquid phase was decanted.

Then a final 125 parts of presscake in the form of one additonal fraction of the presscake and 57 additional parts of the additive were added to the flusher. The flusher was started and again heated to 65° C. 27 Additional parts of the additive were then put into the flusher. The next break occurred and the flusher was stopped. Again, the clear aqueous phase was decanted.

After the last break was poured, 26 parts of 60 percent Petrorez 140/40 percent Magiesol 47 were added to the flusher. The flusher was started, seated and vacuum applied. The flusher was run until the batch temperature 110° C. At this point the cold water was turned on the jacket, and
(a) 67 parts of the Petrorez 140/Magiesol 47/ and
(b) 5 parts of a mixture of 25 percent butyl hydroxy toluene/75 percent Magiesol 47; and
(c) 25 parts of water
were added, and the flusher was stopped while still under vacuum. The fllusher was occasionally started and quickly stopped over a period of 15 minutes to allow for rapid cooling. After this poiint, the temperature of the batch was 70° C. and the cold water on the jacket was turned off. The flusher was started, maintianing vacuum, and the remaining flush thinning vehicle composed of:
(a) 34 parts Magiesol 47; and
(b) 115 parts of 60 percent Petrorez 140/40 percent Magiesol 47 was added as fast as possible. The vacuum was then shut off and the finished produce removed from the flusher. The resulting experimental flush contained 45.8 percent pigment, based on the weight of the flush.

Since the experimental flush contained significantly more pigment that the control (45.8 percent vs. 34 percent for the control), normally the viscosity of the experimental flush would be significantly higher than the control flush. However, when the viscosity of both the control flush and the experimental flush was tested manually (as described in Example 1), it was found that the experimental flush was slightly less viscous than the control flush (the comparative rating was slightly softer). The lower viscosity of the experimental flush was attributed to the presence of the additive.

This example illustrates how the composition and process of the present invention enable one to significantly increase the pigment concentration in the flush without increasing the viscosity of the flush. Thus, by using the composition and process of the present invention, one may provide the inkmaker with a flush which offers advantages due to its higher pigment concentration without the disadvantage of higher viscosity.

EXAMPLE 3

Preparation of a Control Flush

A presscake contained 500 parts (23.6 percent by weight of presscake) of a Lithol Rubine pigment. The presscake was divided into four fractions of equal weight. Two of these fractions were added to a sigma blade mixer known as a flusher. The flusher was started. Steam was applied to the jacket until the temperature reached 65° C. Then the following material was added: of these fractions were added:
(a) 52 parts of a linseed oil alkyd; and
(b) 176 parts of 72 percent Filtrez 3790/28 percent Magiesol 47; and
(c) 94 parts of 60 percent Petrorez 140/40 percent Magiesol 47;

after which a first break occurred and the flusher was stopped. The clear aqueous phase was poured off.

125 Additional parts of pigment in the from of one additional fraction of presscake were added to the flusher. The flusher was started and again heated to 65° C. 87 Parts of 60 percent Petrorez 140/40 percent magiesol 47 were addd, the next break occurred and the flusher was stopped. Again, the clear aqueous phase was decanted. Then a final 125 parts of pigment, in the form of the last remaining fraction of presscake, were added to the flusher. The flusher was started and again heated to 65° C. Then 21 parts of 60 percent Petrorez 140/40 percent Magiesol 47 were added to the flusher, along with 18.3 parts of 77 percent Pentalyn ® K/40 percent Magie 535, a third and final break occurred, and the flusher was stopped. Again, the clear aqueous phase was decanted.

After the last break occurred, 78 parts of 60 percent Petrorez 140/40 percent Magiesol 47 were added to the flsher. The flusher was started, sealed and vacuum applied.

The flusher was run utnil the batch temperature reached 110° C. At ths point, the cold water was turned on the jacket, and
(a) 208 parts of 60 percent Petrorez 140/40 percent Magiesol 47; and
(b) 30 parts Magiesol 47; and
(c) 5 parts of 25 percent butyl hydroxyl toluene 75 percent Magiesol 47; and
(d) 25 grams of water were added, and the flusher was stopped while still under vacuum. The flusher was occasionally started and quickly stopped over a period of fifteen minutes to allow for rapid cooling. After this point, the temperature of the batch was 70° C. and the cold water on the jacket was turned off. The flusher was started, maintaining vacuum, and the remaining flush thinning vehicle composed of:
(a) 125 parts of 60 percent Petrorez 140/40 percent Magiesol 47; and
(b) 31 parts of Magiesol 47; and
(c) 47 parts of 72 percent Filtrez 3790/28 percent Magiesol 47 was added as fast as possible. The vacuum was then shut off and the finished product removed from the flusher. The resulting control flush contained 34 percent pigment, based on the weight of the flush.

We claim:
1. An oil-based pigment dispersion comprising:
   (a) at least 20 percent pigment by weight of dispersion; and
   (b) at least 35 percent carrier by weight of dispersion, wherein the carrier is a hydrophobic organic vehicle; and
   (c) at least 1.0 percent oil-soluble additive by weight of pigment, wherein the oil-soluble additive is a reaction product of an oil-soluble, long chain aliphatic amine having a molecular weight between 80 and 340 and a polybasic organic acid having a molecular weight between 50 and 250.
2. A pgiment dispersion as described in claim 1 wherein the pigment is an organic pigment.
3. The pigment dipsperion as described in claim 2 wherein the additive is a salt.
4. The pigment dispersion as described in claim 3 wherein the acid is adipic acid.
5. The pigment dispersion as described in claim 4 wherein the amine is an alkylamine having a C-18 average chain length.
6. The pigment dispersion as described in claim 3 wherein the dispersion comprises between 1 percent and 10 percrent, by weight of pigment, additive.
7. The pigment dispersion as described in claim 6 wherein the acid is adipic acid.
8. The pigment dispersion as described in claim 7 wherein the amine is an alkylamine having a C-18 average chain length.
9. The pigment dispersion as described in claim 8 wherein the dispersion comprises between 20 percent and 60 percent, based on weight of dispersion, of pigment.
10. The pigment dispersion as described in claim 1, wherein the dispersion has a viscosity at 40° C. of between 1,000 and 6,000 poise at 0.5 sec$^{-1}$ and a yield value at 0.05 sec$^{-1}$ of between 200 and 1000 dynes/cm$^{-2}$, wherein the pigment dispersion further comprises at least 30 percent, by weight of dispersion, of pigment, and wherein the additive is a salt.

11. A pigment dispersion as described in claim 10 wherein the pigment comprises a Lithol Rubine pigment.

12. A pigment dispersion as described in claim 10 wherein the pigment comprises a Diarylide Yellow pigment.

13. The pigment dispersion as described in claim 10, wherein the dispersion comprises between 1 percent and 8 percent, by weight of pigment, additive.

14. The pigment dispersion as described in claim 10 wherein the acid is adipic acid.

15. The pigment dispersion as described in claim 14 wherein the dispersion further comprises between 30 percent and 55 percent, by weight of dispersion, of pigment.

16. A method of making an oil-based pigment dispersion comprising adding to the dispersion between 1.0 percent and 10 percent oil-soluble additive by weight of pigment, wherein the oil-soluble additive is a reaction product of an oil-soluble, long-chain aliphatic amine having a molecular weight between 80 and 340, and a polybasic organic acid having a molecular weight between 50 and 250.

17. A method as described in claim 16 wherein the pigment is an organic pigment.

18. The method as described in claim 16 wherein the additive is a salt of the amine and the acid.

19. The method as desribed in claim 18 wherein the acid is adipic acid.

20. The method as described in claim 19 wherein the amine is an alkylamine having a C-18 average chain length.

* * * * *